United States Patent

Dellora et al.

[11] Patent Number: 5,983,873
[45] Date of Patent: Nov. 16, 1999

[54] ENDOTHERMAL ENGINE PROVIDED WITH A DEVICE FOR PURIFYING THE BLOW-BY GASES OF THE BLOCK

[75] Inventors: Giancarlo Dellora, Settimo Torinese; Domenico Palmisani, Turin, both of Italy

[73] Assignee: IVECO FIAT S.p.A., Turin, Italy

[21] Appl. No.: 08/864,645

[22] Filed: May 29, 1997

[30] Foreign Application Priority Data

May 31, 1996 [IT] Italy .................................. TO96A0474

[51] Int. Cl.$^6$ .................................................. F01M 13/00
[52] U.S. Cl. ............................................................ 123/572
[58] Field of Search .................................... 123/572, 573, 123/574

[56] References Cited

U.S. PATENT DOCUMENTS

| | | | |
|---|---|---|---|
| 3,115,873 | 12/1963 | Hahn et al. | 123/572 |
| 3,313,281 | 4/1967 | Schneider | 123/572 |
| 4,502,424 | 3/1985 | Katoh et al. | 123/572 |
| 4,569,323 | 2/1986 | Okumura | 123/572 |
| 4,627,406 | 12/1986 | Namiki et al. | 123/572 |

*Primary Examiner*—Marguerite McMahon
*Attorney, Agent, or Firm*—Kane, Dalsimer, Sullivan and Levy, LLP

[57] ABSTRACT

An endothermal engine provided with a device for purifying the blow-by gases of the block, comprising a housing provided with an inlet opening communicating with the interior of the block of the engine and an outlet opening for the purified gases and integrally defining an impact separator for the removal of the larger oil particles and a filter member for the separation of the residual oil and particulates housed in a chamber of the housing; the device forms a compact integrated unit which may be readily mounted on the engine.

9 Claims, 2 Drawing Sheets

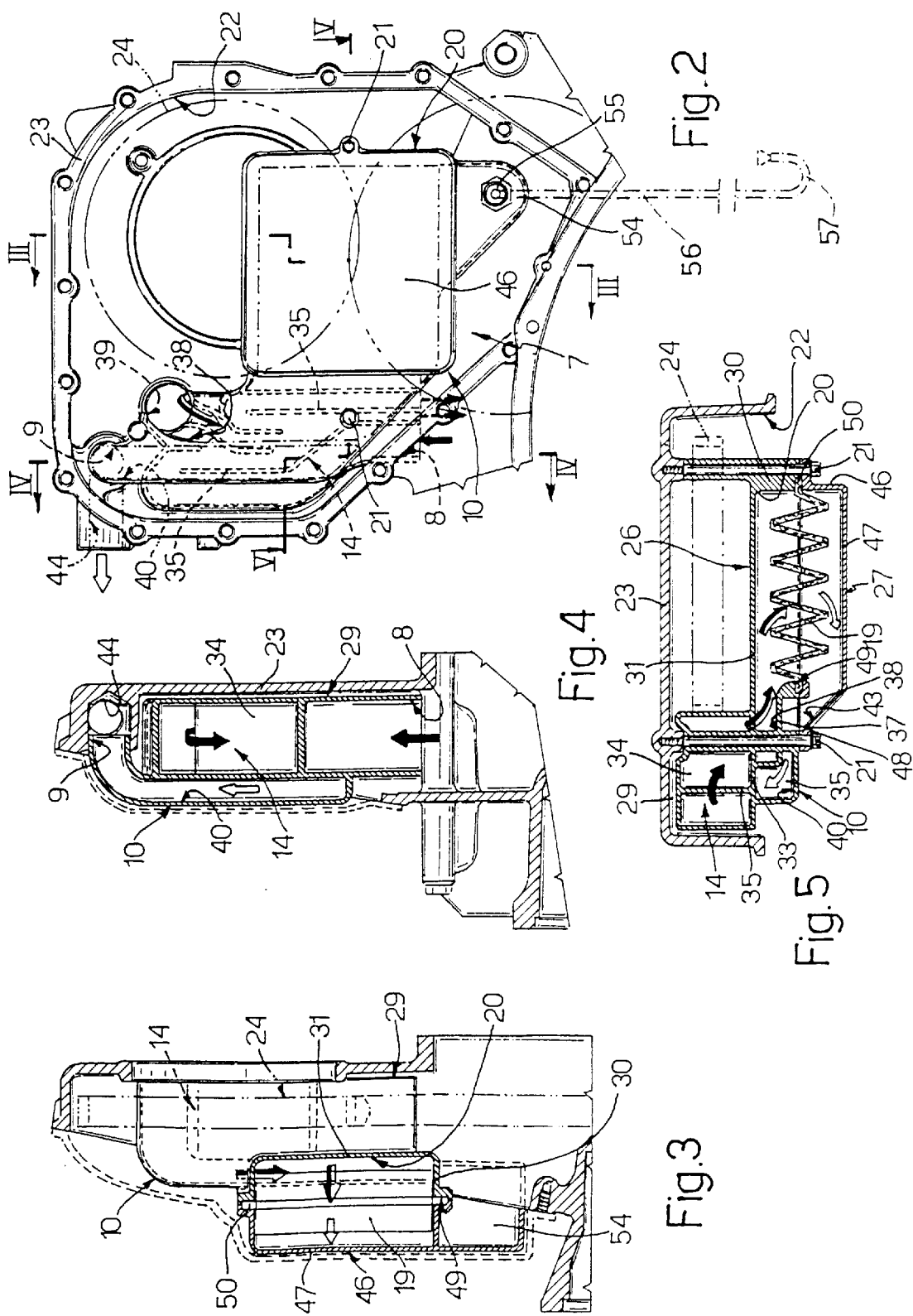

5,983,873

ENDOTHERMAL ENGINE PROVIDED WITH A DEVICE FOR PURIFYING THE BLOW-BY GASES OF THE BLOCK

BACKGROUND OF THE INVENTION

The present invention relates to an endothermal engine provided with a device for purifying the blow-by gases of the block of this engine.

As is known, the blocks of endothermal engines are provided with a bleed circuit adapted to discharge outside this block the so-called "blow-by" gases, i.e. gases that are drawn down by the cylinders into the block via the piston segments. The bleed is necessary both to prevent an increase of pressure within the block and to offset the volume variations due to the movement of the pistons.

The blow-by gases contain finely atomised oil particles as well as particles of non-combusted carbon materials (particulates) having dimensions of the order of some μm, typically between 5 and 8 μm.

The bleed circuit is in some cases of the open type, i.e. it discharges the blow-by gases into the atmosphere; in this case the oil and the particulates have to be separated from the gases for obvious reasons of environmental and health protection (the particulates have carcinogenic effects).

The bleed circuit is in some cases of the closed type and recirculates the blow-by gases to the engine intake in order to ensure the complete combustion of the particulates. In this case as well, however, the separation of the oil and the particulates from these gases raises a problem; the oil and the particulates tend to form resinous sediments on the components through which the gases pass before reaching the cylinders (in particular on the valves and, in the case of turbocharged engines, in the compressor and the intercooler where they greatly reduce the heat exchange), compromising the correct operation of these components. Moreover, in vehicles fitted with catalytic converters, the combustion of any engine oil recirculated to the intake has damaging effects on the catalytic converter and on the lambda probe.

While purifier devices of various types have therefore been proposed, they all have drawbacks.

For instance, impact separators are known in which the flow of gas interacts with walls which cause abrupt changes of direction of this flow; separators of this type are not, however, very efficient as regards the separation of the particulates, since the average dimensions of the particulates are too small, and are very bulky. The use of filter members of a conventional type has also proved to be unsatisfactory per se as they cause substantial losses of load and tend to clog up rapidly. Moreover, the known devices are difficult to integrate into the engine and lead to additional bulk and assembly and maintenance problems.

SUMMARY OF THE INVENTION

The object of the present invention is to provide an endothermal engine provided with a device for purifying the blow-by gases of the block, which is free from the drawbacks connected with the known separator devices described above.

This object is achieved by the present invention which relates to an endothermal engine comprising a head defining a plurality of cylinders, a block, and bleed means for the gases drawn down into the block via these cylinders and containing oil and particulates in suspension, these bleed means comprising a device for purifying these gases having an inlet connected with the interior of the block, an outlet and purifier means interposed between this inlet and outlet, characterised in that this purifier device is an integrated unit comprising a housing that can be secured to the engine and is provided with a first opening forming the inlet and a second opening forming the outlet, these purifier means comprising an impact separator formed by a plurality of inner walls of the housing and a filter member housed in a chamber of this housing.

BRIEF DESCRIPTION OF THE DRAWINGS

For a better understanding of the present invention, a preferred embodiment is described below by way of non-limiting example with reference to the accompanying drawings, in which:

FIG. 2 is a front elevation of a purifier device of the engine of FIG. 1;

FIG. 3 is a cross-section along the line III—III of FIG. 2;

FIG. 4 is a cross-section along the line IV—IV of FIG. 2;

FIG. 5 is a cross-section along the line V—V of FIG. 2.

DETAILED DESCRIPTION OF THE INVENTION

Figure 1:
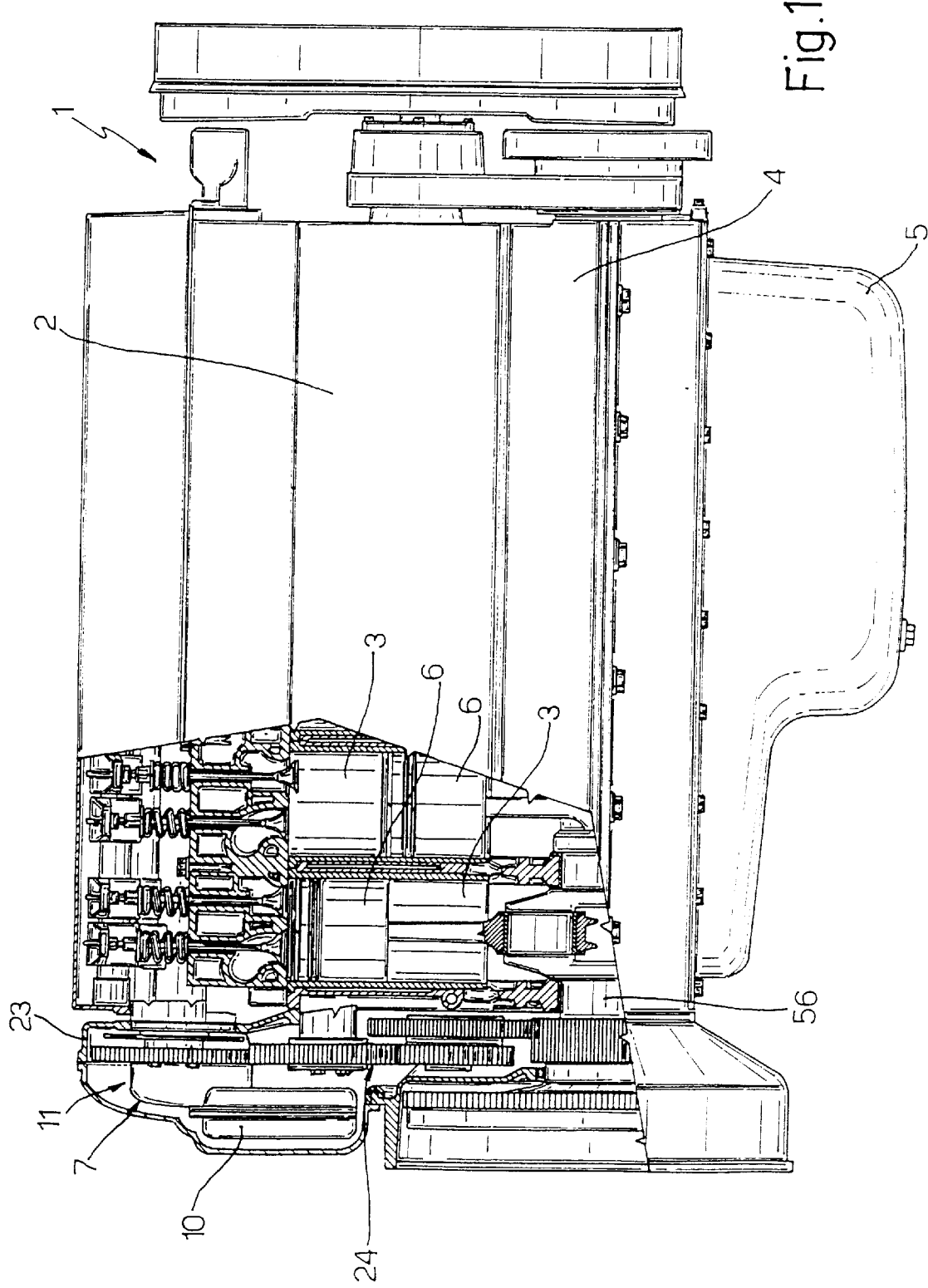
FIG. 1 is a lateral elevation, in partial section, of an endothermal engine embodied in accordance with the present invention.

In FIG. 1, an endothermal engine comprising a head 2 defining a plurality of cylinders 3, a block 4 and a container 5 adapted to contain lubricating oil is shown by 1.

The block 4 of the engine 1 is also provided with a bleed circuit 11 for the external discharge from this block of the so-called "blow-by" gases, i.e. the gases that are drawn down between the cylinders 3 and the relative pistons 6.

These gases contain particles of finely atomised oil in suspension as well as solid particles (particulates) predominantly of a carbonaceous nature which are formed in part by partially non-combusted combustion products and in part by solid impurities normally contained in the oil.

The bleed circuit 11 comprises a purifier device 7 (FIG. 2) having an inlet opening 8 communicating with the interior of the block 4 and an outlet opening 9 adapted to be connected to the engine intake (not shown).

According to the present invention, the purifier device 7 is formed by an integrated unit comprising an external housing 10 defining the inlet 8, the outlet 9 and an impact separator 14, and a filter member 19 housed in a chamber 20 of this housing 10.

The housing 10 is secured to the engine 1 by a plurality of screws 21 at the location of an opening 22 of a casing 23 protecting the timing and flywheel gears 24 and 25 of the engine 1. The housing 10 is advantageously formed by two parts (FIG. 5), in particular a main body 26 and a lid 27 which are fixed together by the same screws 21 as used for fastening to the engine 1.

The main body 26 comprises a box-shaped portion 29 defining the impact separator 14 and a half-shell portion 30 bounding a portion of the chamber 20 upstream of the filter member 19 and having a substantially plane rear wall 31.

The portion 29 is divided by an intermediate wall 33 coplanar with the rear wall 31 of the portion 30 in a rear zone 34 and in a front zone 35. In its lower part the rear zone 34 is provided with the inlet opening 8 which communicates with the interior of the block 4 and is provided with a plurality of substantially vertical baffles 35 defining a convoluted path for the blow-by gases and therefore forming the separator 14; the rear zone 34 is also provided with further lower openings 36 for the drainage of the oil intercepted by the separator 14 as a result of the abrupt deflections to which the flow of gas is subject. The front zone 35 is divided by a partition 37 into a flared duct 38 which enters the portion 30 and communicates with the rear zone 34 via a hole 39 in the intermediate wall 33 and into an outlet duct 40 communicating with a through hole 44 in the casing 23 via the outlet opening 9 (FIG. 4).

The lid 27 comprises a half-shell portion 46 bounding a portion of the chamber 20 downstream of the filter member 19 and having a substantially plane front wall 47 and a shaped portion 48 superposed on the portion 29 of the body 26 and defining a passage 43 for connection between the chamber 20 and the outlet duct 40 (FIG. 5).

The filter member 19 is mounted between the half-shell portion 30 of the body 26 and the half-shell portion 46 of the lid 27 which define between one another a peripheral seat 49 for an edge 50 of this member.

The filter member 19 is advantageously formed by a cartridge of non-woven fibre material whose porosity varies through its thickness; the fabric is advantageously pleated in order to increase the filter surface for the same bulk.

The filter member 19 advantageously has a retaining power such that it allows the passage of the particulates and is of the coalescence type; alternatively it can be of the condensation type.

The half-shell portion 30 of the body 26 and the half-shell portion 46 of the lid 27 further define, at their lower ends, complementary portions of a tray 54 for the collection of the oil and particulates disposed below the filter member 19 and communicating with the downstream portion of the chamber 20. This tray 54 is adapted to collect the oil and particulates separated by the filter member 19 and is provided with a device adapted to allow the contents of the tray to be discharged into a lower zone 56 of the block (FIG. 1), from which the oil may flow into the container, but to prevent the reflux of the gases; this device may be formed by an electrically or pressure controlled drainage valve 55 or by a tube 56 (shown in dot-dash lines) terminated by a syphon 57.

The purifier device 7 operates as follows.

The blow-by gases with the oil and the particulates in suspension (shown by a black arrow) flow through the inlet opening 8 in to the impact separator 14 in which the coarser particles of oil are separated from the flow by inertia and impact against the baffles 35; the oil purified in this way flows into the block 4 via the drainage openings 36 (dashed arrows). Via the duct 38, the flow of gas stripped of the coarser oil particles (black and white arrows) then reaches the chamber 20 and the filter member 19.

The oil particles pass into the filter member 19 where they agglomerate by coalescence to form droplets of dimensions sufficient to prevent them from being drawn downstream; the oil therefore flows into the collection tray 54 and may be recirculated into the lower zone 56 of the block 4 via the valve 55.

The particulates which would tend, in the absence of oil, to pass through the filter member 19 are incorporated into the oil droplets which agglomerate in this member and are recirculated into the block together with the oil.

The gases stripped of the oil and particulates (white arrows) flow through the duct 40 and the outlet opening 9 into the hole 44 of the casing 23 which is connected by a duct (not shown) to the intake of the engine 1.

The advantages that can be achieved with the present invention are evident from an examination of the characteristic features of the engine 1 and, in particular, of the purifier device 7 embodied in accordance with the present invention.

The device 7 forms an integrated unit of reduced bulk that is inexpensive and easy to assemble. The combined use of an impact separator 14 and a filter member 19 makes it possible to reduce the dimensions of the filter to a minimum and to optimise its operation as the larger oil particles are separated out upstream.

Lastly, the use of a filter member with a retaining power such as to allow the passage of the particulates makes it possible to avoid any clogging up of the filter, since the particulates do not accumulate in the filter but are removed by the oil.

It is evident that modifications and variants that do not depart from the scope of protection of the claims can be made to the engine 1 and to the device 7.

For instance, the geometry of the housing 10 may be varied; the device may be mounted on the engine in any other position; the geometry of the filter member 19 may be of any type, for instance in the form of a cylindrical cartridge.

We claim:

1. An endothermal engine (1) comprising a head (2) defining a plurality of cylinders (3), a block (4), and bleed means (11) for gases drawn down into the block (4) via these cylinders (3) and containing oil and particulates in suspension, these bleed means (11) comprising a device (7) for purifying these gases having an inlet (8) connected with the interior of the block (4), an outlet (9) and purifier means (14, 19) interposed between this inlet (8) and outlet (9), characterised in that this purifier device is an integrated unit comprising a housing (10) that can be secured to the engine (1) and is provided with a first opening forming the inlet (8) and a second opening forming the outlet (9), these purifier means comprising an impact separator (14) communicating with said inlet and formed by a plurality of inner walls (35) of the housing (10) defining a convoluted path for said gases and a filter member (19) housed in a chamber (20) of this housing (10).

2. An engine as claimed in claim 1, characterised in that the engine comprises a casing (23) protecting the timing (24) and flywheel gears, the device (7) being secured to the engine (1) at an opening (22) of this casing (23).

3. An engine as claimed in claim 2, characterised in that the engine comprises means for connecting the outlet (9) of the device (7) to intake means of this engine.

4. An engine as claimed in claim 2, characterised in that the housing (10) defines a tray (54) for collecting oil and particulates.

5. An engine as claimed in claim 4, characterised in that the tray is provided with means (55) for discharging oil and particulates into the engine (1) adapted to prevent a reflux of gas.

6. An engine as claimed in claim 2, characterised in that the filter member (19) has a retaining power such as to allow the passage of the particulates.

7. An engine as claimed in claim 2, characterised in that the filter member (19) is of the coalescence type.

8. An engine as claimed in claim 2, characterised in that the filter member (19) is of the condensation type.

9. An engine as claimed in claim 2, characterised in that the filter member (19) has a porosity varying through its thickness.

* * * * *